United States Patent [19]

Gorgens

[11] 4,234,932
[45] Nov. 18, 1980

[54] SECURITY SYSTEM FOR REMOTE CASH DISPENSERS

[75] Inventor: Richard A. Gorgens, Bedford, Mass.
[73] Assignee: Honeywell Information Systems Inc., Waltham, Mass.
[21] Appl. No.: 939,504
[22] Filed: Sep. 5, 1978
[51] Int. Cl.$^3$ ............................................. G06F 15/30
[52] U.S. Cl. .................................. 364/900; 235/379; 364/408
[58] Field of Search ............... 364/900, 408; 235/379, 235/381, 382, 420; 340/149 A

[56] References Cited

U.S. PATENT DOCUMENTS

| | | | |
|---|---|---|---|
| 4,025,760 | 5/1977 | Trenkamp | 364/408 X |
| 4,025,905 | 5/1977 | Gorgens | 364/900 |
| 4,075,460 | 2/1978 | Gorgens | 235/420 |

*Primary Examiner*—David H. Malzahn
*Attorney, Agent, or Firm*—Gerald E. Lester; Nicholas Prasinos; Ronald T. Reiling

[57] ABSTRACT

A banking system is provided which is comprised of a central computer, a customer accounts main memory, and plural remote transaction terminals in communication with the central computer. Each remote terminal includes a cash dispensing apparatus, a personal identification number (PIN) signal generator, a random number (RN) signal generator, a security device and a cash dispenser. The communication paths from the RN and PIN signal generators to the security device are wholly contained within the remote terminal and inaccessible to would-be thieves. The remote terminals also include data entry devices activated by a customer to provide a PIN number, a PIN OFFSET number bearing a predetermined relationship to both the PIN number and a customer information file (CIF) signal stored in main memory, and other banking information. In response to a customer-initiated operation, a remote terminal supplies bank transaction and customer identification information to the central computer. Upon receiving information from a remote terminal, the central computer searches the customer's record in main memory for a CIF number associated with the customer's account. The central computer thereafter forms a composite signal from the RN, CIF and PIN OFFSET signals which is applied to the security device of the remote terminal. The RN signal serves to conceal both the CIF and PIN OFFSET signals from an attempted interception during transmission from the central computer to the remote terminal. The security device includes a comparator for generating a DISPENSE signal when the PIN and RN signals bear a predetermined relationship to the composite signal. The cash dispenser includes a cash storage portion and a dispensing mechanism for issuing one or more cash units in response to a DISPENSE signal.

6 Claims, 2 Drawing Figures

SECURITY SYSTEM FOR REMOTE CASH DISPENSERS

FIELD OF THE INVENTION

The invention relates to automated banking systems, and more particularly to security systems used in combination with cash or negotiable instrument dispensers at locations remote from a central computer-controlled banking facility.

PRIOR ART

With the advent of computer-controlled banking facilities wherein a number of remote automated teller stations are in communication with and controlled by a centrally located computer, certain transaction security problems have become apparent. More particularly, available telephone line monitoring devices and computer related equipment have been developed and used by computer thieves to secure funds from the bank systems. Fraudulently injected enabling signals, and the simulation of valid transactions from points along the communication path between the central computer and a remote terminal have been used successfully.

In response to this problem, prior art systems have developed remote terminals wherein a customer enters a personal identification number (PIN), which is transferred to the central computer for recognition. The central computer in turn authorizes a transaction to take place. The PIN number may be memorized by the user and may take the form of his social security number, his birth date or some other personal data known only to the customer and the bank. The PIN number may be further used in conjunction with a magnetically encoded card which includes data representative of a customer account number, bank number, and zone number. In some cases the card includes an encrypted identification number which relates the PIN number to a customer information file (CIF) signal stored at the central computer. The encrypted identification number is often referred to as the PIN OFFSET.

In the operation of such prior art systems, the customer typically enters his PIN number by way of a keyboard, and passes his magnetic card through registration with a card reader at the remote terminal. PIN and PIN OFFSET signals thereby are transferred to the central computer through telephone lines. At the central computer, the signals are compared with a customer information file (CIF) number which is used to identify the customer account and verify the identity of the customer. The central computer thereafter transmits a transaction authorization signal over the telephone line to the cash dispenser at the remote terminal.

Because of the relative ease by which any signal on a telephone line may be intercepted and simulated, practical systems in the prior art are generally provided with complex data encrypting devices whenever any signal such as the PIN, PIN OFFSET or transaction authorization signal is transmitted over a telephone line. Even though the resultant encrypted signals may be subject to interception, a suitably complex encryption algorithm may reduce the probability of a decoding by a thief. In the case of an authorization signal which is transmitted over the line, however, the mere duplication of the signal ever if in encrypted form usually is sufficient to activate the cash dispenser at the remote terminals.

U.S. Pat. No. 4,075,460 assigned to the assignee of the present invention provides an improved remote terminal cash dispensing system. The security system is comprised of a PIN signal generator, and a security device responsive to both the signal generator and an authorization signal comprised of the customer's CIF number which is supplied by a central computer. The signal path between the signal generator and the security device is wholly contained within the remote terminal. The PIN signal thus cannot be intercepted, and the mere simulation of the authorization signal alone will not penetrate the security of the remote terminal. Although the likelihood of theft is substantially reduced, a theft still may occur if a customer is careless with his PIN number. The PIN number may be entered at the remote terminal by the thief, and the authorization signal from the central computer may be simulated to cause the security device to command a cash release. The security system of the embodiment illustrated in FIG. 2 of the patent is more difficult to penetrate since a PIN OFFSET signal wholly internal to the remote terminal also is applied to the security device by way of a card reader for a comparison. Although the addition of the PIN OFFSET increases the necessity for obtaining both the customer PIN number and his encoded card, a theft still may occur through the use of knowledge gained from the card alone and intercepted signals. For example, once the relationship between a PIN OFFSET and a customer's CIF number is discovered, the customer's PIN may be determined. A customer's CIF number is transferred over telephone lines from the central computer to the remote transaction terminal. The determination of a PIN number is further facilitated from a knowledge of the number of bits comprising the PIN number. Such a BIT signal is supplied by the remote transaction terminal to the central computer. In each case, a cash theft may occur repeatedly once the control information peculiar to the customer is determined.

The invention disclosed herein is directed to a security system for a remote cash dispenser wherein the likelihood of security penetration without knowledge of the customer's PIN number and possession of the customer's encoded card is substantially decreased, and the susceptibility of the system to repeated thefts through the use of the same control information without such knowledge and possession is significantly reduced.

SUMMARY OF THE INVENTION

The present invention is directed to a remote terminal security system for a computer-controlled banking system having plural remote transaction terminals each with a cash dispenser. More particularly, the remote terminal security system is comprised of a personal identification number (PIN) signal generator responsive to a customer initiated operation, a random number (RN) signal generator, and a security device. The security device includes a comparator responsive to the PIN and RN signal generators, and to a composite signal formed by a central computer from customer-related information and an RN signal supplied by the remote terminal. The comparator generates a cash DISPENSE signal when the RN and PIN signals supplied by the remote transaction terminal bear a predetermined relationship with the composite signal supplied by the central computer.

In one aspect of the invention, an RN signal generator in electrical communication with the security device and the central computer is located at the remote transaction terminal. The signal paths from the PIN and RN signal generators to the security device are wholly contained within the remote transaction terminal. In response to a central computer control signal, the RN signal generator supplies a pseudo random number signal to both the security device, and to the central computer to form a composite signal concealing customer-related information. The difficulty is deciphering the composite signal to isolate customer-related information thereby is significantly increased, and theft by the mere interception and simulation of information exhanged between the central computer and the remote transaction terminal is eliminated. Further, susceptibility to repeated thefts through the use of the same control information obtained by such deciphering and simulation is substantially decreased.

In another aspect of the invention, the signal paths from the PIN and RN generators to the security device, and a signal path from a customer-operated data entry device to the security device are wholly contained within the remote transaction terminal. The security device comparator issues a DISPENSE signal when the RN and PIN signals, and the customer information entered by the customer at the remote transaction terminal bear a predetermined relationship to a composite signal formed by the central computer from the RN signal and customer related information.

DESCRIPTION OF THE DRAWINGS

For a more complete understanding of the present invention and for further objects and advantages thereof, reference may now be had to the following description taken in conjunction with the accompanying drawings in which.

DESCRIPTION OF THE PREFERRED EMBODIMENTS

FIG. 1

Figure 1:
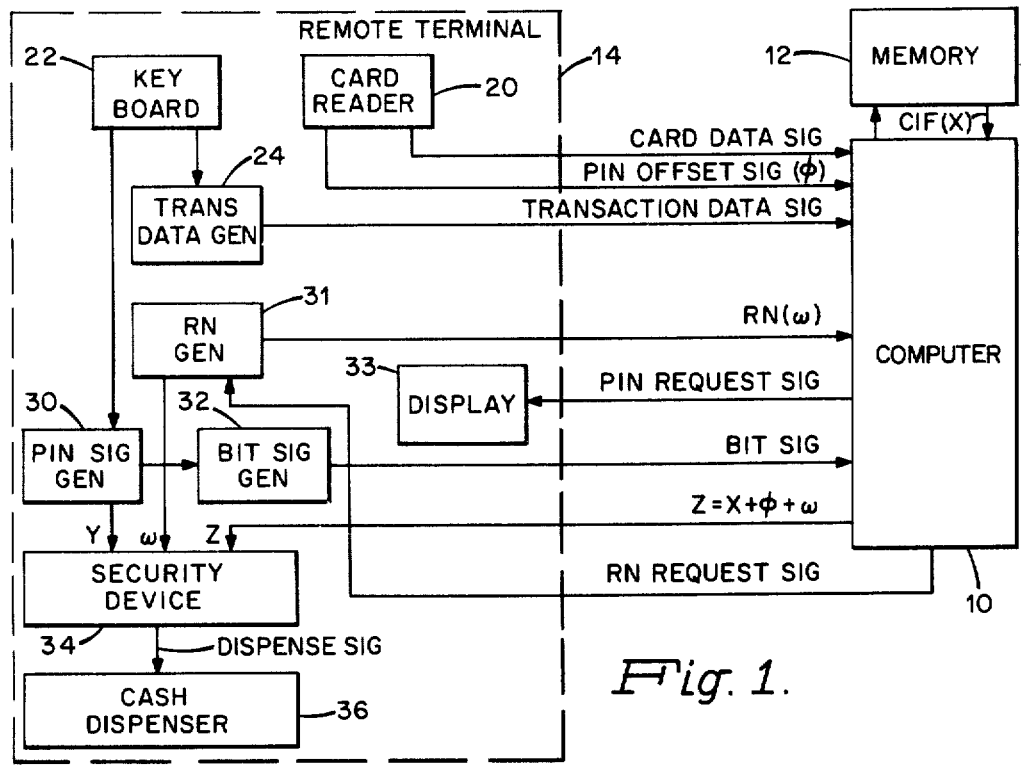
FIG. 1 is a functional block diagram of a remote cash dispensing system embodying the present invention.

FIG. 1 illustrates in block diagram form a computer controlled banking system embodying the invention.

A central computer 10 with main memory 12 is in electrical communication with a remote terminal 14 by way of communication paths as indicated by signal flow arrows. The computer 10 and memory 12 are located at a central bank office where they may be configured to provide on-line or off-line banking functions. The remote terminal 14 is located at a remote office or at a remote location within the central office. A plurality of other terminals similar to terminal 14 also may be in communication with computer 10 by way of communication paths such as telephone transmission lines having modem equipment at the local and remote interfaces.

The remote terminal 14 in the preferred embodiment as described herein includes a magnetic stripe card reader 20 and a keyboard 22 for entering information in response to customer-initiated operations. It is to be understood, however, that any suitable data entry means may be employed. Card reader 20 may be any of many well-known magnetic readers for reading data encoded on magnetic stripes in accordance with ABA, IATA, MINTS or Thrift Standard Track formats. Card reader 20 may also be of other types including card perforation or optical readers. The data field imprinted on the card may include a data word identifying the customer's bank, zone, and account numbers. The data field further may include a PIN OFFSET data word which is converted by card reader 20 to a PIN OFFSET signal referred to as $\phi$ in the drawings. The $\phi$ signal is representative of a predetermined difference relationship between a personal identification number (PIN) and a customer information file (CIF) number stored in the memory 12 of the central computer 10. The PIN number for a customer may be representative of the customer's birth date, social security number or other personal data easily memorized. The CIF number is representative of a record number associated with the customer's account in main memory 12.

Terminal 14 further comprises a conventional transaction data generator 24 responsive to keyboard 22 for converting customer-activated key operations to data representative of a desired banking transaction.

The remote terminal 14 in addition includes PIN signal generator 30, a random number (RN) signal generator 31, a BIT signal generator 32, a display device 33, a security device 34 and a cash dispenser unit 36. The PIN signal generator 30 responds to keyboard 22 by generating a PIN signal referred to in the drawings as Y, which is representative of a seris of numbers entered by the customer. The signal Y is applied to the BIT signal generator 32 and to the security device 34. Generator 32 thereupon generates a BIT signal which is representative of the number of bits in PIN signal Y, and which is supplied to the central computer 10 by way of telephone transmission lines as before described.

The security device 34 receives the PIN signal Y, an RN signal referred to as W in the drawings and generated by the RN signal generator 31 in response to central computer commands, and a composite signal Z supplied by the computer 10. The composite signal Z is formed by central computer 10 from a CIF signal referred to in the drawings as X, the PIN OFFSET signal $\phi$ and the RN signal W. It is to be understood that the signal path for the PIN signal Y between generator 30 and security device 34, and the signal path for the RN signal W between generator 31 and security device 34 are entirely within the remote terminal.

The security device 34 includes a means for comparing the applied W, Y and Z signals in accordance with a predetermined algorithm. For example, using the exemplary polynomial formula $W^2 + Y^2 - Z^2 = 0$, the security device shall effectively square the Z signal and substract the resultant from the sum of the squares of the W and Y signals. In the event the difference equals zero, a DISPENSE signal shall be generated by the security device 34 and applied to cash dispenser unit 36. Alternative polynomials readily may be used.

Cash dispenser unit 36 includes a means for storing a plurality of cash units, such as bills, and for delivering one or more of these stored cash units to the customer in response to an applied DISPENSE signal.

The display 33 includes means to receive a PIN REQUEST signal from computer 10. In other embodiments of this invention, the display 33 may also display transaction data as well as other information generated by the customer or the central computer 10.

In operation, a customer inserts a bank or credit card into the card reader 20. The card data and PIN OFFSET signals thereby are lifted from the card, and transferred to the central computer 10 by way of telephone transmission lines. In response to the card data, the central computer 10 identifies the customer account. The customer then may key in transaction data representative of a desired banking transaction on keyboard 22. By way of example, the customer may activate a series of keys which indicate that a cash withdrawal is desired in the amount of a number of cash units. Transaction data generator 24 responds to the customer action by forwarding representative transaction data to the central computer 10. Computer 10 identifies the transaction data, and verifies whether the customer's balance indicated in memory 12 has sufficient funds to accommodate the indicated transaction.

In the event the transaction data indicates a valid transaction, the central computer 10 issues a PIN REQUEST signal to illuminate a PIN request on display 33 of terminal 14. In an alternative embodiment, the PIN REQUEST signal may control a switching network to provide a direct signal path between PIN signal generator 30 and the security device 34.

When the customer enters his PIN number at keyboard 22, generator 30 is enabled to supply the PIN signal Y. In response thereto, the BIT signal generator transfers a BIT signal representative of the number of bits in the PIN signal Y to central computer 10. Central computer 10 then may compare the BIT signal to the number of bits in the customer's CIF number stored in memory 12. In the event there is a match, the computer issues an RN REQUEST signal to the RN generator 31. The generator 31 is activated thereby to generate a pseudo random number which is supplied to the security device 34 and to the central computer 10. Upon receiving an RN signal W from the RN generator 31, the central computer 10 forms the composite signal Z in accordance with a polynomial equation. For purposes of illustration, the polynomial indicated in FIG. 1 is $Z = X + \phi + W$. The composite signal Z is issued by the central computer by way of telephone transmission lines to the security device 34. Upon receiving the signal Z, the device 34 compares the W and Y signals with the Z signal as before described, and generates a DISPENSE signal in the event the control polynomial is satisfied. In response to the DISPENSE signal, the cash dispenser unit 36 makes a cash unit available to the customer.

In the embodiment of FIG. 1, the random number communication path between generator 31 and security device 34, and the PIN signal Y communication path between the PIN signal generator 30 and device 34 are wholly contained within the remote terminal 14. Further, the composite signal Z is so formed as to conceal the CIF and PIN OFFSET information through a combination with the RN signal W. A potential thief therefore must not only intercept the concept signal Z, but also decipher the signal. Only then could the thief simulate a composite signal after intercepting a current random number signal issued by the RN generator 31 to the central computer 10. Further, a particular simulation of the composite signal Z may not be used repeatedly since the random number changes with each transaction. The security for a remote transaction terminal thus is tightened significantly, and a potential thief is made more dependent on actual knowledge of both the customer's personal PIN number and his encoded card data.

In other embodiments, the BIT signal generator 32 may not be required. In that event, the above operation may be carried out without a comparison of the number of bits in the PIN number with the number of bits in the CIF number. In addition alternative comparison algorithms may be readily programmed into the security device 34. In such algorithms, predetermined bit weighting may be used in addition to or in lieu of algebraic transformations. In still other embodiments, the composite signal Z may include a signal representative of a requirested number of bits so that the DISPENSE signal directs dispenser unit 36 to deliver a specific number of cash units to the customer. Furthermore, the card reader 20 may not be required for cash dispensing systems where the transaction data is entirely provided by a customer-controlled transaction data generator. Otherwise, operation of these latter embodiments may proceed as described above in conjunction with the system of FIG. 1.

It is to be understood that in the preferred embodiment as described herein, the data transferred over the telephone transmission lines does not include the customer-memorized PIN, nor does that data include a signal which in itself is sufficient to authorize the activation of the cash dispenser.

FIG. 2

Figure 2:
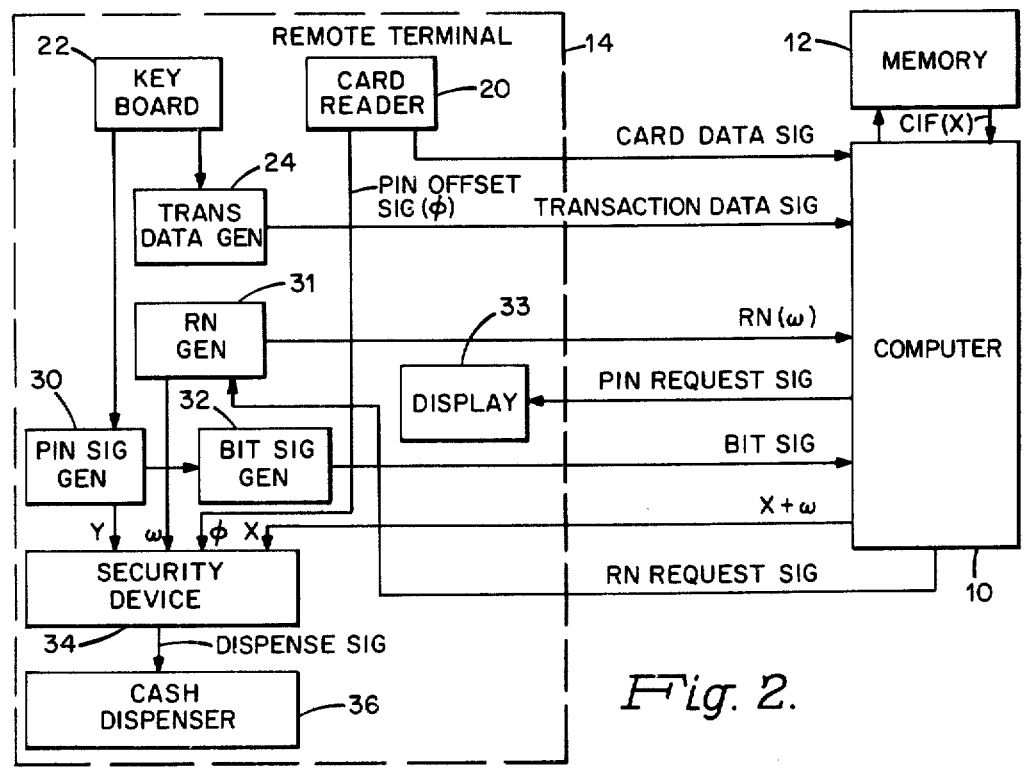
FIG. 2 is a functional block diagram of an alternative remote cash dispensing system embodying the invention.

An alternative embodiment is illustrated in FIG. 2 wherein elements identical to those in FIG. 1 are identified with the same reference numerals. The principal difference between the embodiments of FIG. 1 and FIG. 2 is the path of the PIN OFFSET signal $\phi$. In FIG. 2, the PIN OFFSET signal $\phi$ is transferred from the card reader 20 directly to the security device 34 without passing over a telephone transmission line. The computer 10 therefore transfers a composite signal Z comprised only of the CIF signal X and the RN number W. The security device 34 may be a four input system which performs a four variable polynomial computation, e.g. $\phi^2 + Y^2 + W^2 - Z = 0$. In the event the polynomial is satisfied for an applied set of signals (W, $\phi$, Y, Z), the security device 34 generates a DISPENSE signal which in turn activates the cash dispenser unit 36.

It will be understood that the embodiment of FIG. 2 operates in substantially the same manner as the embodiment of FIG. 1, except that each of the PIN OFFSET, PIN and RN signals are retained wholly within terminal 14.

The concepts of the preferred embodiments of FIGS. 1 and 2 may be employed in other environments than that of a banking system. For example, in an automated security system for controlling the ingress and egress of persons at remote entry locations, the cash dispenser unit 36 may be replaced by an audio or visual indicator, or a turnstile responsive to the security device 34. Although the keyboard 22 and card reader 20 are described in the preferred embodiments, any suitable data entry means may be used whether operated by a security guard or a person seeking admission at a remote location.

The invention may be embedded in other specific forms without departing from the spirit or essential characteristics thereof. The present embodiments are therefore to be considered in all respects as illustrative and not restrictive with the scope of the invention being indicated by the appended claims rather than by the foregoing description. All changes which come within the meaning and range of equivalency of the claims are therefore intended to be embraced therein.

What is claimed is:

1. A security system for a remote transaction terminal of an automated banking system including a central computer with a main memory and a plurality of remote transaction terminals in electrical communication with said central computer, said remote transaction terminal having customer operated data entry means and a cash dispenser, which comprises:

(a) first generator means responsive to an electrical signal received from said data entry means for providing an identification signal representative of a customer personal identification number;

(b) second generator means responsive to a random number request signal received from said central computer for supplying a pseudo random number signal to said central computer; and (c) comparator means in electrical communication with said first generator means and said second generator means by way of signal paths wholly contained within said remote transaction terminal, and in electrical communication with said central computer for issuing a cash dispense signal to said cash dispenser when a composite signal received from said central computer bears a predetermined relationship with said identification signal received from said first generator means and said random number signal received from said second generator means, said composite signal being formed by said central computer from a customer record signal stored in said main memory, from an offset signal supplied by said data entry means and bearing a predetermined relationship between said identification signal and said customer record signal, and from said random number signal.

2. An automated security system for a remote access terminal in electrical communication with a central computer including a main memory and a plurality of remote access terminals in electrical communication with said central computer, said remote access terminal having an access control means and a data entry means operable by a user desiring to gain access, which comprises:

(a) first generator means responsive to an electrical signal received from said data entry means for providing an identification signal representative of a user personal identification number;

(b) second generator means responsive to a random number request signal received from said central computer for supplying a pseudo random number signal to said central computer; and (c) comparator means in electrical communication with said first generator means and said second generator means by way of signal paths wholly contained within said remote access terminal, and in electrical communication with said central computer for issuing an authorization signal to said access control means when a composite signal received from said central computer bears a predetermined relationship with said identification signal received from said first generator means and said random number signal received from said second generator means, said composite signal being formed by said central computer from a customer record signal stored in said main memory, from an offset signal supplied by said data entry means and bearing a predetermined relationship between said identification signal and said customer record signal, and from said random number signal.

3. A security system for controlling the access of a user at a remote station, which comprises:

(a) a central computer system including a central computer and a main memory located at a central station;

(b) a user operated data entry means located at said remote station;

(c) first generator means located at said remote station and responsive to an electrical signal received from said data entry means for providing an identification signal representative of a user personal identification number;

(d) second generator means located at said remote station and responsive to a random number request signal received from said central computer for supplying a pseudo random number signal to said central computer;

(e) control means located at said remote station for preventing said user from gaining unauthorized access; and (f) comparator means in electrical communication with said first generator means and said second generator means by way of signal paths wholly contained within said remote station, and in electrical communication with said central computer for issuing an authorization signal to said control means when a composite signal received from said central computer bears a predetermined relationship with said identification signal received from said first generator means and said random number signal received from said second generator means, said composite signal being formed by said central computer from a user record signal stored in said main memory, from an offset signal supplied by said data entry means and bearing a predetermined relationship between said identification signal and said user record signal, and from said random number signal.

4. A security system for controlling the access of a user at a remote station, which comprises:

(a) a central computer system including a central computer and a main memory located at a central station;

(b) a user operated data entry means located at said remote station;

(c) first generator means located at said remote station and responsive to an electrical signal received from said data entry means for providing an identification signal representative of a user personal identification number;

(d) second generator means located at said remote station and responsive to a random number request signal received from said central computer for supplying a pseudo random number signal to said central computer;

(e) control means located at said remote station for preventing said user from gaining unauthorized access; and (f) comparator means in electrical communication with said data entry means, said first generator means and said second generator means by way of signal paths wholly contained within said remote station, and in electrical communication with said central computer for issuing an authorization signal to said control means when a composite signal received from said central computer bears a predetermined relationship with said identification signal received from said first generator means, with said random number signal received from said second generator means, and with an offset signal supplied by said data entry means and exhibiting a predetermined relationship between said identification signal and a user record signal stored in said main memory, said composite signal being formed by said central computer from said user record signal and said random number signal.

5. A security system for a remote transaction terminal of an automated banking system including a central computer with a main memory and a plurality of remote transaction terminals in electrical communication with said central computer, said remote transaction terminal having customer operated data entry means and a cash dispenser, which comprises:
   (a) first generator means responsive to an electrical signal received from said data entry means for providing an identification signal representative of a customer personal identification number;
   (b) second generator means responsive to a random number request signal from said central computer for supplying a pseudo random number signal to said central computer; and
   (c) comparator means in electrical communication with said first generator means, said data entry means and said second generator means by way of signal paths wholly contained within said remote transaction terminal, and in electrical communication with said central computer for issuing a cash dispense signal to said cash dispenser when a composite signal received from said central computer bears a predetermined relationship with said identification signal received from said first generator means, said random number signal received from said second generator means, and an offset signal received from said data entry means and exhibiting a predetermined relationship between said identification signal and a customer record signal stored in said main memory, said composite signal being formed by said central computer from said customer record signal and said random number signal.

6. An automated security system for a remote access terminal in electrical communication with a central computer including a main memory and a plurality of remote access terminals in electrical communication with said central computer, said remote access terminal having an access control means and a data entry means operable by a user desiring a gain access, which comprises:
   (a) first generator means responsive to an electrical signal received from said data entry means for providing an identification signal representative of a user personal identification number;
   (b) second generator means responsive to a random number request signal received from said central computer for supplying a pseudo random number signal to said central computer; and
   (c) comparator means in electrical communication with said first generator means, said data entry means and said second generator means by way of signal paths wholly contained within said remote access terminal, and in electrical communication with said central computer for issuing an authorization signal to said access control means when a composite signal received from said control computer bears a predetermined relationship with said identification signal received from said first generator means, said random number signal received from said signal generator means, and an offset signal received from said data entry means and exhibiting a predetermined relationship between said identification signal and a customer record signal stored in said main memory, said composite signal being formed by said central computer from said customer record signal and said random number signal.

* * * * *

UNITED STATES PATENT AND TRADEMARK OFFICE
CERTIFICATE OF CORRECTION

PATENT NO. : 4,234,932
DATED : November 18, 1980
INVENTOR(S) : Richard A. Gorgens It is certified that error appears in the above-identified patent and that said Letters Patent are hereby corrected as shown below:

In Claim 6, line 9, the phrase "desiring a gain" should should be changed to read
-- desiring to gain --.

In Claim 6, line 30, the word "second" should be substituted for the word
-- signal --.

Signed and Sealed this

Twenty-first Day of April 1981

[SEAL]

Attest:

RENE D. TEGTMEYER

Attesting Officer

Acting Commissioner of Patents and Trademarks